Patented Nov. 6, 1934

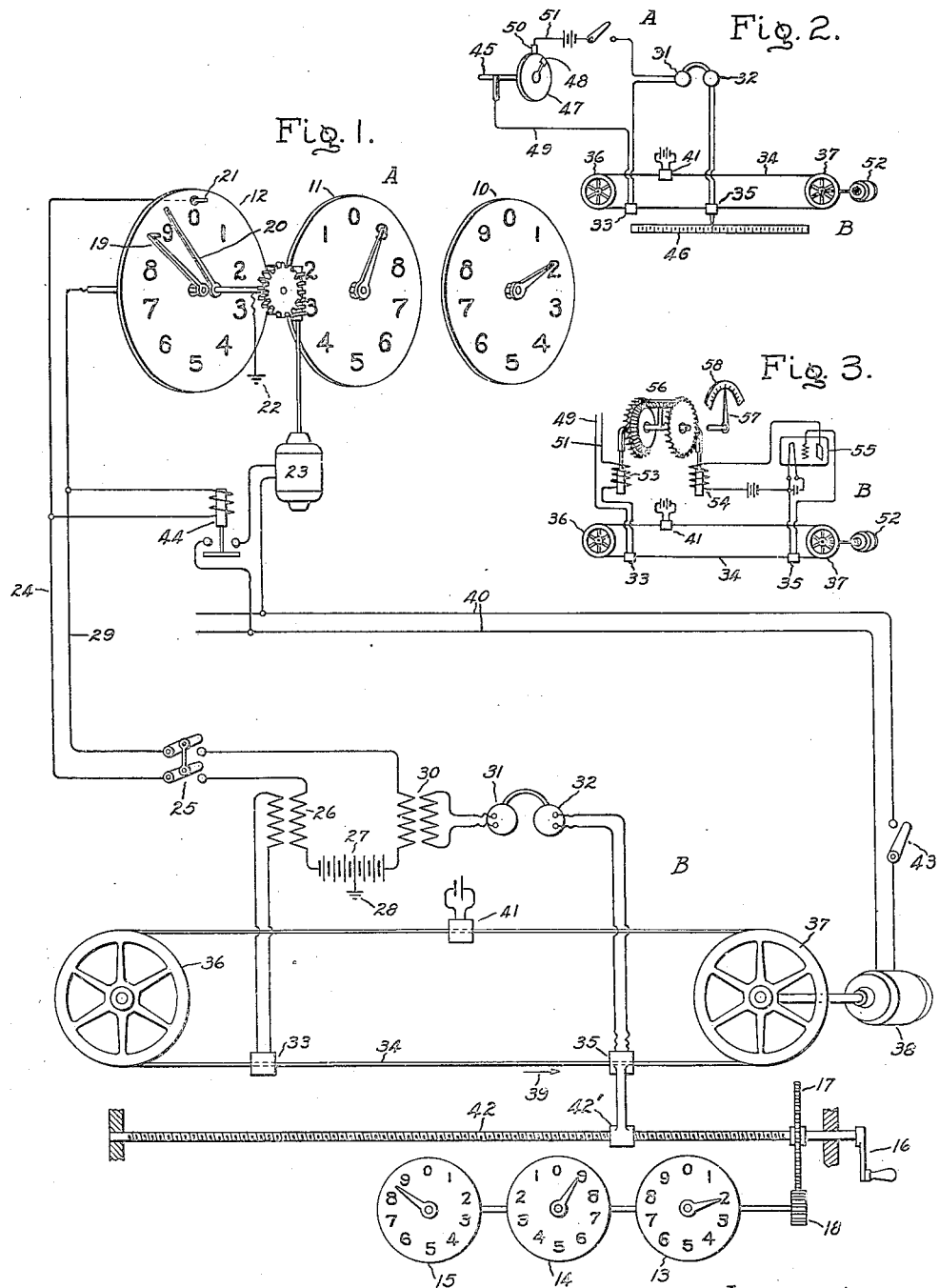

1,979,998

UNITED STATES PATENT OFFICE 1,979,998

TELEMETERING METHOD AND APPARATUS

David R. Price, Swampscott, Mass., assignor to General Electric Company, a corporation of New York Application August 26, 1930, Serial No. 477,907

8 Claims. (Cl. 177—351)

My invention relates to a method and apparatus for determining the magnitude of a variable or the position of a movable device at some distant point, for example for determining at a central station the position of a meter pointer, the meter being located on the customer's premises several miles distant from the central station.

In carrying my invention into effect I establish signaling impulses at a sending station spaced apart in time relation either directly or inversely in proportion to the magnitude of some variable; for example, to the displacement of a movable device from some reference point. These time spaced signalling impulses are transmitted to the receiving station where they are received by suitable apparatus after the time of reception of some of them have been retarded. Preferably an impulse is retarded sufficiently to enable it to be received simultaneously with the next impulse. The extent of the retardation necessary for the simultaneous reception of the signals is measured and this measurement is then an indication of the variable or the position of the movable device with respect to the reference point at the sending station which may be reproduced in the form of a corresponding indication at the receiving station.

The means which I prefer to employ for delaying the reception of signalling impulses at the receiving station is an adjustable form of telegraphone.

The features of my invention which are believed to be novel and patentable will be pointed out in the claims appended hereto. Various modifications and uses for my invention will occur to those skilled in the art. In the following description I have described three such modifications and uses, the arrangement shown in Fig. 1 of the drawing being arranged to transmit and reproduce a meter dial indication. In Fig. 2 I have represented the invention as used for indicating the speed of rotation of a shaft at a remote point and in Fig. 3 I have shown a form of receiver adapted to produce a maximum demand indication.

Referring to the drawing, Fig. 1, A and B respectively represent the sending and receiving stations. At A is a meter having units, tens and hundreds dials 10, 11 and 12 respectively and the object of the invention is to obtain the reading of such dials at station B on dials 13, 14 and 15. It will be understood that the pointers of the dials at station A are suitably geared to a driving meter so that the pointer on dial 10 revolves ten times for each rotation of the pointer of dial 11 and 100 times for each rotation of the pointer on dial 12. The pointers of dials 13, 14 and 15 are similarly geared to their driving mechanism which constitutes a hand operated crank 16 and gears 17 and 18. The pointer 19 of the hundreds dial at station A is provided with a contact at its outer end adapted to be connected to ground at 22 through a revolving contact arm 20 when the two are adjacent each other. Arm 20 also is arranged to make contact with a stationary contact 21 opposite the zero or reference point of the dial when arm 20 moves past this point, thereby connecting this contact to ground at 22. Arm 20 is rotated about the dial when the telemetering apparatus is in operation by means of a synchronous motor 23. I will assume that the arm 20 rotates in a clockwise direction at a rate of one revolution per second although as will appear later the direction and rate of rotation of arm 20 is immaterial. When arm 20 passes contact 21 a circuit is closed as follows: ground 22, arm 20, contact 21, line 24 to station B, switch 25 (closed when the apparatus is in operation), the primary winding of a transformer 26, through left half of battery 27 and back to ground at 28. When arm 20 passes pointer 19 a circuit is closed through line 29 to station B through the primary of a transformer 30, the right side of battery 27 and ground. Thus electric signalling impulses supplied from battery 27 are transmitted to the primaries of transformers 26 and 30 by the rotation of arm 20 past contact 21 and the contact on pointer 19, the spaced time relation of such impulses depending upon the variable position of pointer 19 or the magnitude of its displacement from the reference point measured in a clockwise direction. The impulse through transformer 30 is conveyed through the secondary directly to a telephone receiver 31 in which it causes an audible click. The impulse through transformer 26 is conveyed to a telephone receiver 32, not directly, but through an adjustable telegraphone device comprising a coil 33, a moving magnetic wire or tape 34 and a coil 35, together with the circuit connections shown between the secondary of transformer 26 and coil 33 and between coil 35 and the telephone receiver 32. The magnetic wire 34 runs over a pair of pulleys 36 and 37 driven by a synchronous motor 38. Consequently the magnetic wire is moved through or past coils 33 and 34 in the direction of the arrow 39 at a rate which is proportional to the rate of rotation of arm 20, the synchronous motors 23 and 38 being connected to the same alternating current supply 40. When the circuits are closed as they will be when the telemetering apparatus is in operation an electric impulse through transformer 26 and coil 33 produces a local condition of magnetization in the portion of the magnetic wire 34 adjacent to coil 33 when the impulse comes in. When this magnetized spot on the wire reaches coil 35 an impulse is induced in coil 35 and a click is heard in telephone receiver 32. Coil 41 is provided to eradicate the magnetic record on the wire by demagnetization as the wire passes this point. Thus, impulses corresponding to the zero position 21 are transmitted to coil 33, magnetically recorded on the wire 34 at coil 33, carried to the right to coil 35, retransformed into an electric impulse and received at the telephone receiver 32 in the form of a sound click.

Since I have assumed that arm 20 makes one revolution per second I will assume that the wire travels at the rate of 10 feet per second to simplify the explanation. Thus, if the position of pointer 19 corresponds to a reading of 892 on the dials of the meter at station A and I move coil 35 8.92 feet to the right of coil 33 the sound click in telephone receiver 32 originating at the zero position contact 21 will be delayed .892 seconds in reaching the telephone receiver 32 and will be received simultaneously with the click in telephone receiver 31 which originates at pointer 19. Thus, the distance between coils 33 and 35 becomes a measure of the reading of dial 12 when the two clicks are received simultaneously. The telephone receivers 31 and 32 are in the form of a set of head phones so that a person may receive the two sets of clicks in his two ears.

It is known, and I have demonstrated the fact, that if two sounds are led, one to the left ear, and one to the right ear, they can be synchronized very exactly if means are provided to retard or advance the time of arrival of one of the sounds. So sensitive is this method that two sounds may be synchronized within 1/100,000th of a second with a little practice, a degree of sensitivity greater than is required for the successful operation of the telemetering apparatus herein described. The telephone receiver 32 may be made more sensitive than telephone receiver 31 or other suitable provision made for compensating for the loss of energy occasioned in transmitting the signal through the telegraphone apparatus.

As has been indicated, coil 35 is adjustable back and forth along the wire 34 and this is accomplished by means of the hand crank 16, threaded shaft 42, and nut 42' on which coil 35 is supported. When crank 16 is operated to move coil 35 the pointers of dials 13, 14 and 15 are also moved and the gear relation of this mechanism is such that, in the example given, a movement of coil 35 one foot to the right advances the pointer on dial 13 ten revolutions, the pointer on dial 14 one revolution, and the pointer on dial 15 1/10th revolution. The dial settings are initially adjusted to correspond to those of the dials at station A when the sound signals are synchronized. This may be done for example by setting the dials exactly alike and moving coil 33 until the sound clicks are synchronized. Then, thereafter, synchronizing of the sounds by movement of coil 35 will move the pointers of dials 13, 14 and 15 to positions corresponding to the readings of the dials at the distant station A. It would appear that when the indication of dial 12 is less than 1 and close to the zero point, coil 35 will be so close to 33 as to cause mechanical interference and prevent a correct setting. This difficulty may be easily overcome by having the zero setting of coil 35 10 feet from 33 instead of at 33 so that the reproducer coil 35 receives its zero indicating record at the same instant that another record is being placed on the wire at coil 33. It will be apparent that the back lash in the gearing between different dial pointers at both stations and in the worm 42, gears 17 and 18, should be reduced to a minimum and that the contact points 19, 20 and 21 should be carefully positioned and adjusted to establish light contacts of short duration without disturbing the normal positions thereof if high accuracy is to be obtained. The degree of accuracy obtainable will be determined by these mechanical considerations rather than by the sensitivity of sound synchronization. Very good accuracy of the contact point positions may be obtained by making the radius of arm 20 to the point of contact relatively large.

The apparatus will normally be inactive in the embodiment of the invention which I have illustrated in Fig. 1. To determine the reading of the meter at station A from station B the synchronous motor 38 will be energized by closing a switch 43. This will start the wire 34 in operation. The operator then closes switch 25. This closes the circuit of a relay 44 at station A and starts synchronous motor 23. The operator then puts on the head phones 31 and 32 and turns crank 16 until the sound clicks in the receivers are synchronized. He then reads dials 13, 14 and 15 and opens switches 43 and 25. The current to relay 44 is supplied by battery 27 and flows through the transformers 26 and 30, but since this is a steady direct current it does not interfere with the signalling impulses and this provides a simple way of starting and stopping the synchronous motor at station A without using an extra control circuit. In most cases the alternating current supply for the synchronous motors may be taken from an existing alternating current distribution system. The lines 24 and 29 may be a portion of an existing telephone circuit.

In Fig. 2 I have represented the essential parts of a modification of my invention as arranged to indicate at station B the speed of rotation of a shaft located at station A. The parts similar to those of Fig. 1 are indicated by like reference characters.

We may assume that at station A there is a variable speed shaft 45 driven by an integrating meter for example and that it is desired to indicate its speed on scale 46 at station B. The shaft 45 is provided with a rotating disc 47 having a conducting segment 48 connected to line 49. A stationary brush 50 connected to line 51 rests on the disc 47. Lines 49 and 51 run to station B and complete a circuit containing a battery, a hand switch, the telephone receiver 31, and the coil 33 of the telegraphone. The magnetic wire of the telegraphone is driven by a motor 52. For the use of the apparatus referred to above, motor 52 must run at some constant speed corresponding to the calibration of the scale 46.

The circuit between stations A and B is closed, motor 52 started and the head phones put on by the operator. Signalling impulses are simultaneously received by telephone receiver 31 and coil 33, which impulses are spaced apart in time relation inversely proportional to the speed of shaft 45. Coil 35 is moved to the right from coil 33 until it picks up a delayed impulse at the same instant the next later impulse is received at 31 and 33. The distance between 33 and 35 along scale 46 is then the distance the wire is travelling for each rotation of shaft 45. If the wire travels one foot per second and the distance of coil 35 from 33 is two feet when the signals are synchronized we know that the speed of shaft 45 is ½ revolution per second, or 30 R. P. M. The scale 46 is marked accordingly, the higher end of the scale being toward coil 33. If now by suitable means the speed of the wire is changed to say 10 feet per second the same position of coil 35 when the signals are synchronized will indicate a speed of 5 revolutions per second of shaft 45, or 300 R. P. M.

If the transmitter at station A is made a constant speed device sending out timed impulses the apparatus at B may be used to determine the speed of motor 52.

In Fig. 3 I have represented a pair of relays 53 and 54 which may be substituted for the telephones 31 and 32 of Fig. 2, relay 54 preferably having an amplifying tube 55 between it and the coil 35 of the telegraphone. Such an arrangement may then be employed to produce an indication of the maximum demand of the meter operating shaft 45 at station A. Relays 53 and 54 operate ratchet devices driving two sides of a differential 56 the central member of which operates a demand pointer 57 cooperating with a suitable scale 58. If it is desired to indicate the maximum demand over a 15 minute interval, coils 33 and 35 will be separated such a distance and the speed of the wire 34 will be such that it takes 15 minutes for a point on wire 34 to move from 33 to 35. The coils will remain stationary unless it is desired to change the demand interval. Impulses coming in over wires 49 and 51 will be recorded on wire 34 and will cause relay 53 to advance the pointer 57 up scale. After 15 minutes has elapsed the delayed impulses recorded on wire 34 will start to reach coil 35 and will cause the actuation of relay 54 to move pointer 57 down scale. As a result the pointer will continuously indicate the number of impulses recorded on wire 34 over the preceding 15 minute interval or the continuous maximum demand over such interval of the meter driving shaft 45 at the distant station A. If now it is desired to obtain the demand over a 10 minute interval coil 35 may be moved to the left one-third the distance to coil 33.

In accordance with the provisions of the patent statutes I have described the principle of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States, is:

1. The method of determining at a receiving station the relative displacement of a movable device with respect to a reference point at a sending station which consists in establishing at the sending station signals spaced in time relation in proportion to the displacement of the movable device from the reference point, transmitting such signals to the receiving station, retarding the reception of one of said signals, receiving the signals in the form of sound signals after one of them has been retarded to the extent necessary for both to be heard simultaneously, and measuring the extent of such retardation in the form of a displacement corresponding to the displacement of the movable device from its reference point at the transmitting station.

2. A position signalling system comprising a device movable with respect to a reference point, means for establishing two impulses spaced in time relation in proportion to the displacement of the movable device from the reference point, means for transmitting such impulses to a distant point, separate means at said station for receiving said two impulses, adjustable means for delaying the reception of one of said impulses whereby the impulses may be received simultaneously, and means at said station operated by the adjustment of the adjustable means for producing an indication corresponding to the displacement of said movable device from its reference point.

3. A telemetering system for indicating devices comprising in combination with such a device a transmitter for transmitting electric signalling impulses spaced in time relation in proportion to the magnitude of the indication of such device, receiving means including adjustable means for synchronizing the time of reception of said signals so that they may be received simultaneously, and means operated in response to the adjustment of the synchronizing means for reproducing the indication of said indicating device when the signals have been synchronized.

4. A system for transmitting the indication of an indicating device comprising in combination with such an indicating device a transmitter for establishing reoccurring signalling impulses in groups of two, the impulses of a group being spaced apart in time relation in proportion to the magnitude of the indication of said device, a telephone receiver for receiving one of the signals of a group without delay in its transmission, another telephone receiver for receiving the other signal of a group, means for delaying the reception of the last mentioned signal, means for adjusting said delaying means until the signals of a group are received simultaneously by the receivers, and means operated with the adjustment of said delaying means for reproducing the indication of said indicating device when simultaneous reception of said signals is established.

5. A telemetering system comprising an indicator, means for establishing and transmitting a pair of signal impulses spaced apart in time relation proportional to the magnitude of the indication of said indicator, means for adjustably delaying the reception of the first occurring signalling impulse, means for receiving said impulse after such delay, a second receiving means for receiving the last occurring signalling impulse without delay, and means operated with the adjustment of the delaying means for reproducing the indication of said indicator.

6. A telemetering system comprising in combination with a variable speed device, a transmitter for producing signalling impulses spaced apart in time relation inversely proportional to the rate of rotation of the variable speed device, a telephone receiver directly influenced by such impulses, a telegraphone, a second telephone receiver influenced by such impulses after their passage through said telegraphone, the latter delaying the time of reception of said impulses, means for adjusting the extent of such delay, and means measuring the extent of such delay in terms of the speed of the variable speed device.

7. A telemetering system comprising a dial provided with an indicating pointer, a contact on said pointer, a stationary contact on said dial, a constant speed rotating device adapted to make contact with both of said contacts to establish and transmit signalling impulses spaced apart in time relation proportional to the value of the indication of said dial, a pair of conductors over which the signalling impulses are transmitted to a distant point, means at said distant point for adjustably delaying the reception of the impulse established at the aforesaid stationary contact, receiving means responsive to the delayed signal impulse, receiving means responsive to the other signal impulse which is received without delay, means for adjusting the delaying means until said signals are received simultaneously, a dial at said distant point and a pointer cooperating with said dial adjusted with the adjustment of the delaying means to reproduce the indication of the first mentioned dial.

8. A telemetering system comprising in combination with a variable speed device, a transmitter for producing signalling impulses spaced apart in time relation inversely proportional to the rate of rotation of the variable speed device, an impulse receiver directly influenced by such impulses, a telegraphone, a second impulse receiver influenced by such impulses after their passage through said telegraphone, the latter delaying the time of reception of said impulses, and means for comparing the time of reception of the impulses by the two impulse receiving means to determine the average speed of the variable speed device during the period in which an impulse is delayed by said telegraphone.

DAVID R. PRICE.